United States Patent [19]

Lytle et al.

[11] 4,110,912
[45] Sep. 5, 1978

[54] TRIAXIAL DEFLECTION METER

[75] Inventors: John David Lytle, St. Louis; James M. Combs, Wentzville, both of Mo.

[73] Assignee: The United States of America as represented by the Secretary of the Army, Washington, D.C.

[21] Appl. No.: 828,796

[22] Filed: Aug. 29, 1977

[51] Int. Cl.² ............................ G01C 9/00; G01B 5/30
[52] U.S. Cl. .................................... 33/312; 73/88 R
[58] Field of Search .................. 73/88 R, 88 C, 88 E; 33/312, 302, 304

[56] References Cited

U.S. PATENT DOCUMENTS

| | | | |
|---|---|---|---|
| 3,780,442 | 12/1973 | Gresho | 33/178 E |
| 3,808,697 | 5/1974 | Hall | 33/312 |
| 3,821,856 | 7/1974 | Rapp | 33/178 E |
| 3,862,499 | 1/1975 | Isham et al. | 33/312 |

Primary Examiner—Anthony V. Ciarlante
Attorney, Agent, or Firm—Thomas O. Maser

[57] ABSTRACT

Apparatus for conducting measurements of displacement, deflection, tilting, and/or rotation of structures such as floodwalls, retaining walls, dam piers, buildings, embankments and the like is disclosed. The apparatus of this invention has the capability of simultaneously making measurements in two planes, parallel and perpendicular, with respect to an axis or other predetermined reference. Further, the apparatus of this invention includes means for determining the azimuthal bearing of the apparatus relative to the axis or other predetermined reference when the aforementioned measurements are conducted. The apparatus of this invention includes a measuring unit having a housing that houses first and second servo-accelerometers; first, second and third amplifiers; and a rotational variable differential transformer. The amplifiers are electrically coupled to a meter by means of a cable having electrical conductors. Measurements can be obtained with the measuring unit in a fixed mount orientation or in an orientation where the measuring unit is moved vertically through a tube or casing. In the fixed mount mode of operation, a base plate is secured to the bottom of the measuring unit housing and the base plate is then secured to an embedded anchor or base plate. When the measuring unit is moved vertically through a tube or casing to obtain the desired measurements, a first set of guide wheels is secured to the top of the measuring unit housing and a second set of wheels is secured to the bottom of the housing. The interior of the tube or casing through which the measuring unit is moved vertically contains grooves or channels that serve as guide tracks for the two sets of wheels.

10 Claims, 3 Drawing Figures

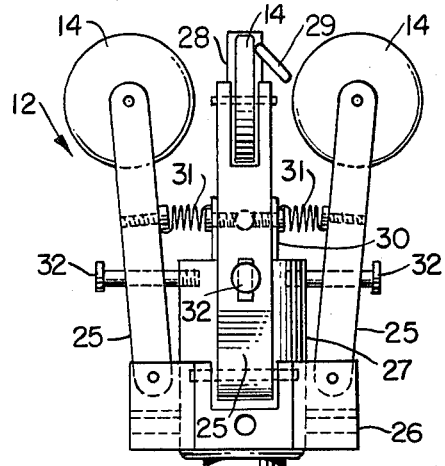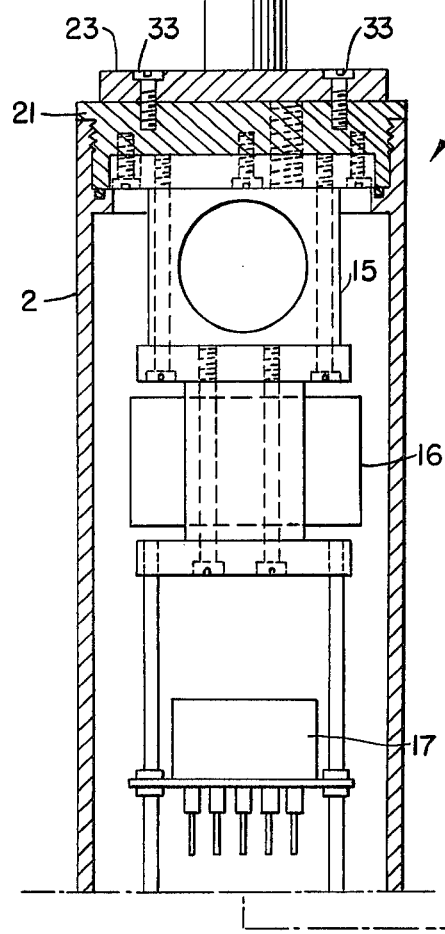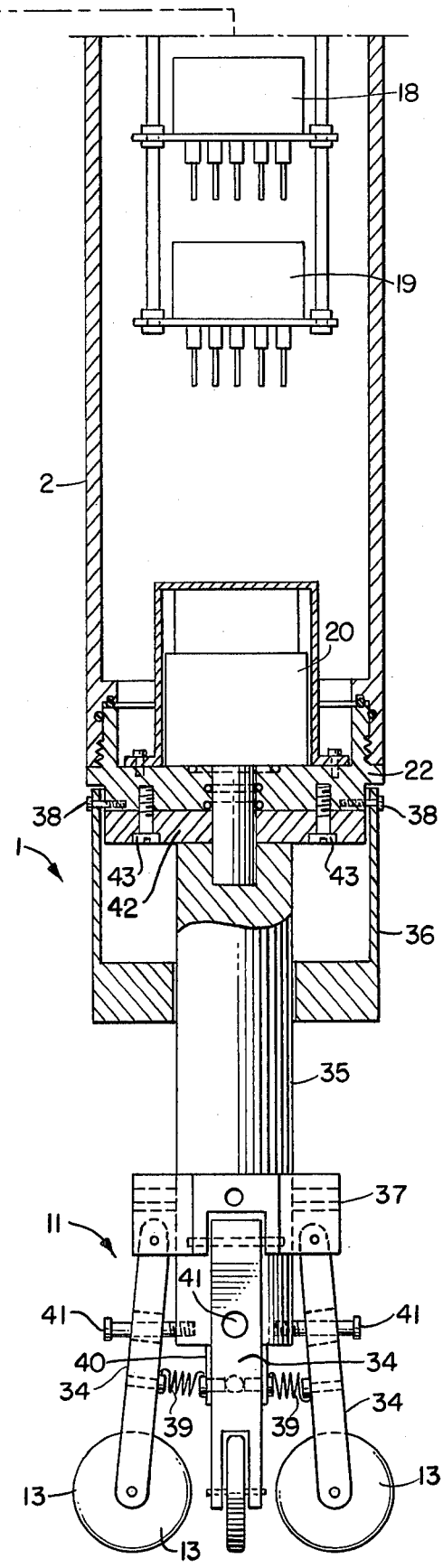
FIG. 2.

TRIAXIAL DEFLECTION METER

The invention described herein may be manufactured, used, and licensed by or for the Government for Governmental purposes without the payment to us of any royalties thereon.

BACKGROUND OF THE INVENTION

The invention relates to deflection meters and more specifically to triaxial deflection meter apparatus.

Devices for conducting deflection measurements in structures, such as floodwalls, retaining walls, dam piers, buildings, embankments and the like, are well known in the art. These devices are commonly referred to as inclinometers or deflection meters and many different inclinometers or deflection meters are available on the market.

This invention represents an improvement over the prior art inclinometers or deflection meters in that the deflection meter of this invention has the capability of measuring twist and deflection simultaneously. Further, the apparatus of this invention includes means for determining the azimuthal bearing of the measuring unit of this invention at the same time measurements of deflection, tilt and/or rotation are obtained with the measuring unit.

SUMMARY OF THE INVENTION

The apparatus of this invention includes a measuring unit housing that houses a first servo-accelerometer, a first amplifier coupled to the output of the first servo-accelerometer, a second servo-accelerometer, a second amplifier coupled to the output of the second servo-accelerometer, a rotational variable differential transformer (RVDT) and a third amplifier coupled to the output of the RVDT. A cable containing electrical conductors connects the amplifiers located in the housing of the measuring unit to a remote meter.

The deflection meter of this invention can be operated in a fixed or stationary mode or in a mode where the measuring unit is moved vertically through a grooved or channeled casing or tube. When operated in the fixed mode, a base plate is secured to the bottom of the measuring unit housing and this base plate is then secured to an anchor or base plate that has been embedded in the structure that is the subject of the measurements that are to be taken.

When operated in the mode where the measuring unit is moved vertically through a casing or tube, a first set of wheels is secured to the top end of the measuring unit housing and a second set of wheels is secured to the bottom end of the measuring unit housing. The tube or casing through which the measuring unit is moved contains channels or grooves that serve as guide tracks for the two sets of wheels. The measuring unit is moved vertically through the tube or casing by means of the cable that contains the electrical conductors.

BRIEF DESCRIPTION OF THE DRAWING

A complete understanding of the structural features and operational characteristics of the invention can be obtained from the following detailed description when read in conjunction with the annexed drawing in which:

FIG. 2 shows a preferred embodiment of the measuring unit of this invention with the housing of the measuring unit being shown in cross-section; and FIG. 3 is a schematic diagram of the electronic circuitry of the preferred embodiment of FIG. 2.

DETAILED DESCRIPTION OF THE INVENTION

Figure 1:
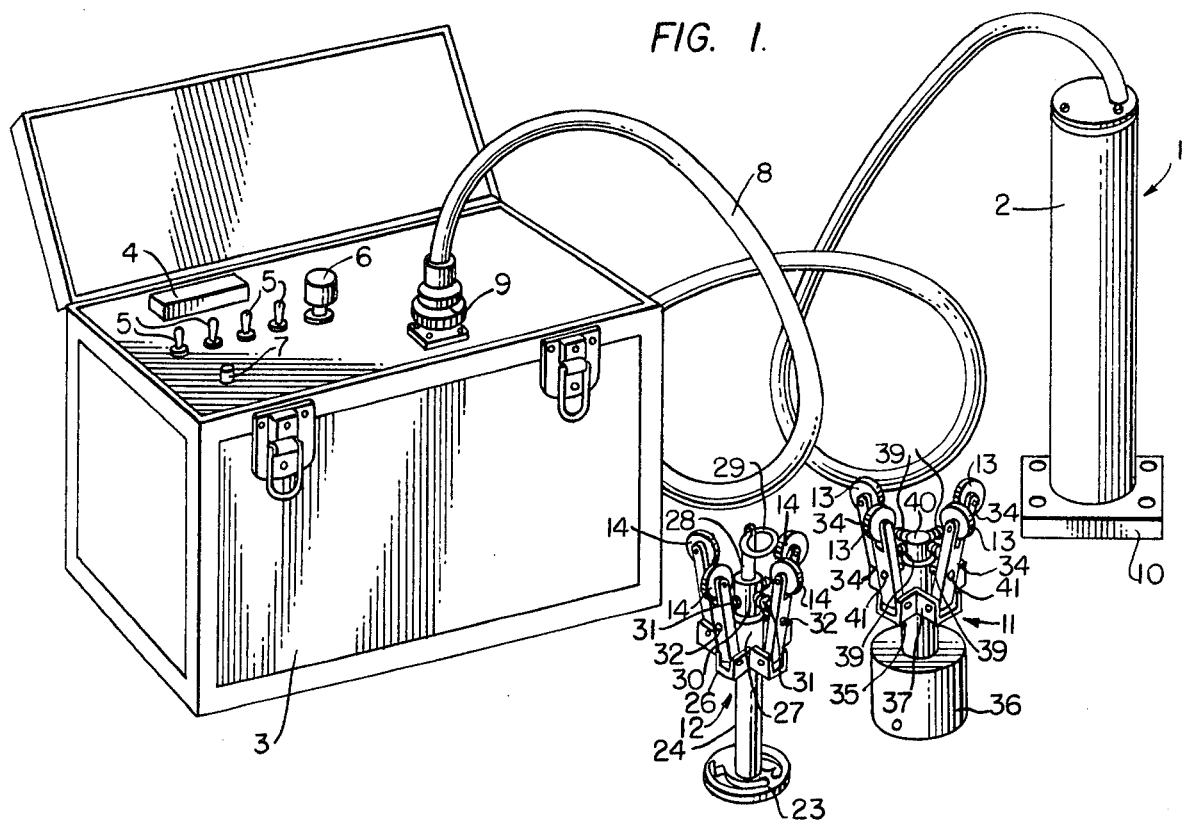
FIG. 1 is a pictorial view of the apparatus of this invention.

Referring to FIG. 1, the basic components of this invention are the measuring unit 1 that includes a cylindrical housing 2 and the chest 3. Chest 3 contains a meter 4, a plurality of switches 5, a meter control knob 6, and an ON-OFF switch 7. Chest 3 also contains the D.C. power supply for the measuring unit 1. The D.C. power supply is housed inside chest 3 and is, therefore, not visible in FIG. 1. The power supply and meter 4 are electrically connected to measuring unit 1 by means of the cable 8 that contains electrical conductors. A connector 9 at one end of cable 8 mates with a connector provided on the top surface of chest 3. The connector on chest 3 is hidden by cable connector 9. The other end of the cable 8 passes through the top of housing 2 and into the inside of housing 2.

As will be described in detail later herein, measuring unit 1 can be operated in two different modes. In one of the two modes of operation, the base plate 10 is detachably secured to the bottom end of housing 2 as shown in FIG. 1. In the second mode of operation base plate 10 is replaced by the bottom wheel assembly 11 and a top wheel assembly 12 is detachably secured to the top end of housing 2. Bottom wheel assembly 11 contains the four wheels 13 and top wheel assembly 12 contains the four wheels 14. The manner in which base plate 10 and bottom wheel assembly 11 are interchangably secured to the bottom end of housing 2 and the manner in which top wheel assembly 12 is detachably secured to the top end of housing 2 will be described in detail with reference to FIG. 2.

Referring now to FIG. 2, this figure shows a preferred embodiment of measuring unit 1 with top wheel assembly 12 secured to the top end of housing 2 and bottom wheel assembly 11 secured to the bottom end of housing 2. Thus, as shown in FIG. 2, measuring unit 1 is assembled for operation in the second mode mentioned above.

In order to render the components mounted in housing 2 visible, housing 2 is shown in cross-section in FIG. 2. As shown in FIG. 2, a first servo-accelerometer 15 is mounted inside housing 2 near the top end of housing 2. A second servo-accelerometer 16 is mounted directly beneath first servo-accelerometer 15 and second servo-accelerometer 16 is followed by the three amplifiers 17, 18 and 19 that are mounted in succession going from the top end of housing 2 toward the bottom end of housing 2, as shown in FIG. 2. The manner in which first and second servo-accelerometers 15 and 16 and the three amplifiers 17, 18 and 19 are mounted and secured inside of housing 2 is apparent from the drawing and, therefore, no detailed description of the mounting and securing structure is set forth herein. The structure shown in FIG. 2 for securing servo-acceleromaters 15 and 16 and amplifiers 17, 18 and 19 inside housing 2 is a preferred structure since this structure provides a convenient and operationally suitable mounting and securing structure. However, servo-accelerometers 15 and 16 and amplifiers 17, 18 and 19 could be secured inside housing 2 by any other suitable mounting and securing structure. The top end of housing 2 is closed by means of the end cap 21. End cap 21 is threaded into housing 2 and is therefore readily removable from housing 2. Since end cap 21 forms a part of the mounting and securing structure for servo-accelerometers 15 and 16 and amplifiers 17, 18 and 19, these components can easily be withdrawn from inside housing 2 for maintenance, repair or replacement by merely unscrewing end cap 21 and then lifting end cap 21 away from housing 2 to withdraw these components out of housing 2.

Referring now to the bottom end of housing 2, a rotational variable differential transformer (RVDT) 20 is secured inside housing 2 near the bottom end of housing 2 in the manner shown in FIG. 2. Again, the manner in which RVDT 20 is secured inside housing 2 is the preferred method of mounting; however, any other suitable and operationally functional mounting structure could be provided. The bottom end of housing 2 is closed by the end cap 22 which is threaded into housing 2 so that end cap 22 can be readily removed. Since RVDT 20 is secured to end cap 22 RVDT 20 can be readily removed from inside housing 2 for maintenance, repair or replacement by merely unscrewing end cap 22 and withdrawing RVDT 20.

Upper wheel assembly 12 includes the four wheels 14 (previously mentioned) only three of which are visible in FIG. 2, a base 23, a post 24, the wheel arms 25, only three of which are visible in FIGS. 1 and 2. A different one of the wheels 14 is rotatably mounted to one end of each of the arms 25 and the other end of each wheel arm 25 is pivotally mounted to the base 26 which is secured to post 24. A sleeve 27 is also secured to post 24. A post 28 carrying the ring 29 at its top end is secured to sleeve 27. A sleeve 30 is secured to post 28. A separate spring 31, only two of which are clearly visible in FIGS. 1 and 2, is secured between sleeve 30 and each of the wheel arms 25. One end of each spring 31 is secured to sleeve 30 while the other end of each spring 31 is secured to a different one of the wheel arms 25 such that one spring 31 is associated with each of the wheel arms 25. Each wheel arm 25 is also provided with a set screw 32, only three of the set screws 32 are visible in FIG. 2 and only two are visible in FIG. 1. Each set screw 32 passes through its associated wheel arm 25 and is threaded into a threaded hole provided in sleeve 27 opposite each wheel arm 25. The purpose and function of the set screws 32 and springs are described later herein. Wheel assembly 12 is detachably secured to end cap 21 by means of the bolts 33, base 23 being provided with holes to accommodate bolts 33.

Bottom wheel assembly 11, which is similar to top wheel assembly 12, is secured to the bottom of housing 2. As shown in FIGS. 1 and 2, wheel assembly 11 includes the four wheels 13, a wheel arm 34 associated with each of the wheels 13, a post 35, a sleeve or cover 36, a wheel arm carrying bracket or plate 37 and a mounting plate 42. In FIG. 2 only three of the wheels 13 and the wheel arm 34 are visible, while in FIG. 1 all four of the wheels 13 and wheel arms 34 are visible. One end of each of the wheel arms 34 is pivotally secured to bracket or plate 37 which is secured to post 35 and a different one of wheels 13 is rotatably secured to the other end of each arm 34. Bottom wheel assembly 11 is secured to end cap 22 by means of the bolts 43 which pass through holes provided in mounting plate 42 and thread into threaded holes provided in end cap 22. Cover or sleeve 36 is secured to end cap 22 by means of the bolts 38 which pass through holes provided in sleeve 36 and thread into threaded holes provided in end cap 22. A spring 39, only two of which are visible in FIG. 2, is associated with each wheel arm 34. One end of the spring 39 is secured to a different one of the wheel arms 34 and the other end of each spring 39 is secured to the post 40 opposite its assocated wheel arm 34. Post 40 is smaller in diameter than post 35 and can be secured to post 35 by, for example, providing a threaded hole in post 35 with mating threads being provided in post 40, or by providing a hole in post 35 and securing post 40 into this hole by bolts, or posts 35 and 40 can be a one-piece post with the end that constitutes post 40 being machined down to the smaller diameter. Further, instead of the structure shown in FIGS. 1 and 2, a sleeve similar to sleeve 27 of top wheel assembly 12 could be provided with posts 35 and 40 being secured to opposite ends of this sleeve.

A set screw 41, only three of which are visible in FIG. 2 with only two being clearly visible in FIG. 1, is associated with each of the wheel arms 34. Each of the set screws 41 pass through a hole provided in its associated wheel arm 34 and is screwed into a threaded hole provided in post 35 opposite each wheel arm 34. The purpose and function of set screws 41 and springs 39 are described later herein.

As previously mentioned, the apparatus of this invention can be operated in two different modes. In the first mode, base 10 is secured to housing 2 instead of top and bottom wheel assemblies 11 and 12 which are used in the second mode of operation. Base plate 10 is secured to housing 2 by bolting base plate 10 to end cap 22.

Cable 8 and the electrical conductors contained therein are not shown in FIG. 2 in order to avoid cluttering up this view of measuring unit 1. With cable 8 and therefore the electrical leads in place, the components inside housing 2 would become somewhat obscured in FIG. 2. FIG. 3, however, which is a schematic diagram of a preferred embodiment of the circuitry does show the various electrical interconnections of the components of this invention. As shown in FIG. 3, the output of servo-accelerometer 15 is coupled to the input of amplifier circuit 17; the output of servo-accelerometer 16 is coupled to the input of amplifier circuit 18; and the output of RVDT 20 is coupled to the input of amplifier 19. Amplifier circuits 17, 18 and 19 are known amplifier circuits that merely function to amplify signals applied to their inputs; therefore, no further description of these amplifier circuits should be required since one skilled in the art is familiar with the operation of such amplifiers. The servo-accelerometers 15 and 16 are a well known type of servo-accelerometer that generates an error signal when tilted out of its neutral plane, the magnitude of the error signal being proportional to the amount of tilt. Rotational variable differential transformer 20 is also a well known device of the type that generates an error signal when its shaft is rotated out of a neutral point. The error signal is "+" for clockwise rotation and "−" for counter clockwise rotation. As shown in FIG. 2, servo-accelerometers 15 and 16, amplifiers 17, 18 and 19 and RVDT 20 are physically located inside housing 2 of measuring unit 1.

The output of each of the amplifiers 17, 18 and 19 is coupled to digital panel meter 4 through the switch 42. Digital panel meter 4 is located in chest 3 as is shown in FIG. 1. In addition switch 42 of FIG. 3 is equivalent to three of the four switches having the numeral 5 in FIG. 1. Instead of the three switches shown in FIG. 1, a single rotary switch such as switch 42 of FIG. 3 can be used. A D.C. to A.C. inverter 43 is directly coupled to digital panel meter 4. Inverter 43 is also located in chest 3. A battery 44 which is also located in chest 3 is coupled to the circuitry through ON-OFF switch 7 and inverter 43 is coupled to battery 44 through switch 5 which is the fourth of the four switches 5 shown in FIG. 1 on chest 3. The terminals 45, 46 and 47 are jack connections for applying power to amplifiers 17, 18 and 19, servo-accelerometers 15 and 16, and RVDT 20. The actual connections are not shown since the manner in which power is applied to such circuit elements is well known. These connections are made via the electrical conductors contained in cable 8. Similarly, the outputs of amplifiers 17, 18 and 19 are connected to rotary switch 42 of FIG. 3 as to three of the switches 5 in FIG. 1 by means of the electrical conductors in cable 8. The interconnections between servo-accelerometer 15 and amplifier 17, servo-accelerometer 16 and amplifier 18, and RVDT 20 and amplifier 19 are, of course, direct interconnections made between these elements.

In addition to the circuitry shown in FIG. 3, chest 3 can be designed to have battery charging terminals so that battery 44 can be recharged in place. This can be accomplished by providing a battery charger located inside chest 3 with means to couple an A.C. source to the battery from outside chest 3 or by the use of an external charger with means to couple the output of the battery charger to battery 44 from outside chest 3. Of course, battery 44 could be removed from chest 3 for charging purposes. In addition, chest 3 can be provided with a plug or receptacle or the like so that an auxiliary battery can be connected in the circuit, if battery 44 fails.

As mentioned previously, measuring unit 1 can be used in two different modes of operation. In one mode, hereinafter called the stationary mode, measuring unit 1 is physically mounted to an anchor plate or the like and in the other mode, hereinafter called the vertical movement mode, measuring unit 1 is moved vertically through a tube or casing.

When a structure is being built, an anchor plate or the like is embedded in the structure if deflection, tilt and/or rotation measurements of the structure are to be accomplished by the stationary mode of operation. If the deflection, tilt and/or rotation measurements are to be accomplished by the vertical movement mode of operation, a grooved or channeled tube or casing is embedded in the structure as it is being built. Of course, both a tube and an anchor plate can be provided with a given structure so that the measurements can be made by either or both modes of operation of measuring unit 1.

Considering first the vertical movement mode of operation, wheels 13 of lower wheel guide assembly 11 and wheels 14 of upper wheel guide assembly 12 are designed to ride in the grooves or channels provided inside the casing. Lower wheel guide assembly 11 is provided with an index mark to assure proper orientation of measuring unit 1 with the grooves or channels in the tube or casing and the control axis of interest. The axis usually selected for the control axis is the axis that is perpendicular to a centerline. Wheels 13 of wheel assembly 11 are placed in the grooves or channels, properly oriented with respect to the index mark. Springs 39 which are tension springs bear wheels 13 against the grooves or channels in the casing. The tension provided by springs 39 can be adjusted by adjustment screws 41 to assure that wheels 13 will properly ride in the grooves or channels. After tension screws 41 have been properly adjusted, measuring unit 1 is lowered into the tube or casing with wheels 14 of upper wheel assembly 12 also riding in the grooves or channels of the casing. Springs 31 of upper wheel assembly 12 hold wheels 14 against the grooves or channels. If the tension provided by springs 31 is not correct, the tension is adjusted by means of adjustment screws 32. After the tension of each of the springs 31 of wheel assembly 12 and the tension of each of the springs 39 of wheel assembly 11 has been properly adjusted, measuring unit 1 is ready to be lowered to the bottom of the tube or casing.

Measuring unit 1 is lowered to the bottom of the tube or casing with wheels 13 and 14 riding in the channels or grooves of the casing or tube by means of a cable that is secured to ring 29 of wheel assembly 12. Instead of providing a separate cable secured to ring 39, cable 8 which can be an electrical cable with a steel support can be used to lower measuring unit 1 into the tube or casing. In any event, whether a separate cable or cable 8 is used to lower measuring unit 1 into the tube or casing, the cable used has permanent markings spaced along its length so that the position of measuring unit 1 with respect to the bottom of the tube or casing can be readily determined, the bottom of the tube or casing being fixed since the tube or casing is embedded into a solid mass.

Measuring unit 1 is lowered to the bottom of the casing or tube and then the first measurements are taken. First amplifier 17 is connected to digital panel meter 4 to obtain a reading of the output of servo-accelerometer 15; amplifier 18 is then connected to digital panel meter 4 to obtain a reading of the output of servo-accelerometer 16; and then amplifier 19 is connected to digital panel meter 4 to obtain a reading of the output of RVDT 20. These three readings are recorded as they are observed. Measuring unit 1 is then raised upward until the first mark on the cable is reached and the three meter readings are again observed and recorded. Measuring unit 1 is then moved upward until the next mark is reached on the cable and meter readings are again observed and recorded. In this manner meter readings are observed and recorded at each mark on the cable until measuring unit 1 is completely removed from the tube or casing. After measuring unit 1 is completely removed from the tube or casing, it is turned 180° and again lowered into the tube or casing and the above enumerated measurements are repeated with each of the measurements being recorded. The reason for obtaining two sets of measurements is to cancel out any error at each measurements that may have occured due to extraneous circumstances.

The measurements or readings obtained from servo-accelerometers 15 and 16 through amplifiers 17 and 18 provide a measure of the deflection or tilt of the structure in two planes, one parallel to the control axis and the other perpendicular to the control axis, servo-accelerometers 15 and 16 being perpendicular to each other. The reading obtained from RVDT 20 through amplifier 19 provides the azimuthal measurement. The azimuthal reading will be either "+" or "−" depending upon clockwise or counter clockwise, respectively. Thus, as previously mentioned, the apparatus of this invention is capable of taking the azimuthal measurement of measuring unit 1 simultaneously with the taking of the measurement of deflection, tilt or rotation. With this information, the true deflection or tilt can be computed since the deflection or tilt is the vector of the actual bearing to the true bearing of the reference.

Panel meter 4 is, as indicated above, a digital meter and as used in the apparatus of this invention is a tilt indicator. However, the readings obtained from digital panel meter 4 are not a direct reading of deflection or tilt. In order to obtain the angular deflection or tilt, the readings of digital panel meter 4 are compared with a calibration chart which lists the digital readings and their angular equivalents. The values listed on the calibration chart are established for each measuring unit 1 by means of a precision tilt-table.

If measuring unit 1 is to be used in the stationary mode of operation, lower wheel assembly 12 is removed and base plate 10 is bolted to the bottom end of housing 2. Base plate 10 is then bolted to the anchor that has been embedded in the structure under study and the desired measurements are taken. However, when measuring unit 1 is bolted to the embedded anchor, azimuthal measurements are not required and, therefore, RVDT 20 and amplifier 19 are not really required. However, in order that a given measuring unit 1 can be used in both modes of operation, all such measuring units will include RVDT and amplifier 19. If, of course, it is known that a given measuring unit will only be used in the stationary mode of operation, RVDT 20 and amplifier 19 would normally be omitted to save cost.

In use measuring unit 1 may be subjected to moisture, particularly when the measuring unit is used in the vertical movement mode and is, therefore, lowered into a tube or casing. End caps 21 and 22 do provide a tight seal; however, in order to assure absolute water tightness of measuring unit 1, housing 2 may be filled with nitrogen under pressure.

While the invention has been described with reference to a specific embodiment, it will be apparent to those skilled in the art that various changes and modifications can be made to the specific embodiment shown and described without departing from the spirit and scope of the invention as set forth in the claims.

We claim:

1. A deflection meter for measuring deflection, tilt and rotation of a grooved casing, comprising:
    a hollow body being open at its top end and at its bottom end;
    a top end cap detachably secured to said hollow body for closing said top end of said hollow body;
    a bottom end cap detachably secured to said hollow body for closing said bottom end of said hollow body;
    a first servo-accelerometer secured inside said hollow body, said first servo-accelerometer having an output;
    a second servo-accelerometer secured inside said hollow body, said second servo-accelerometer having an output;
    a first amplifier secured inside said hollow body, said first amplifier having an input and an output;
    a second amplifier secured inside said hollow body, said second amplifier having an input and an output;
    a third amplifier secured inside said hollow body, said third amplifier having an input and an output;
    means for coupling said output of said first servo-accelerometer to said input of said first amplifier;
    means for coupling said output of said second servo-accelerometer to said input of said second amplifier;
    a rotational variable differential transformer secured inside said hollow body, said variable differential transformer having an output;
    means for coupling said output of said variable differential transformer to said input of said third amplifier;
    a source of electrical power located remote from said hollow body;
    means for coupling said source of electrical power to said first servo-accelerometer, said second servo-accelerometer, said first amplifier, said second amplifier, said third amplifier and said variable differential transformer;
    a meter;
    means for selectively coupling said output of said first amplifier, said output of said second amplifier and said output of said third amplifier, one at a time, to said meter, and
    first and second guide means secured to said top and bottom end caps, respectively, said second guide means connecting said rotational variable differential transformer.

2. A deflection meter as defined in claim 1 wherein said means for coupling said source of electrical power to said first servo-accelerometer, said second servo-accelerometer, said first amplifier, said second amplifier, said third amplifier, and said variable differential transformer include an "ON-OFF" switch.

3. A deflection meter as defined in claim 2 wherein said first servo-accelerometer is secured inside said hollow body adjacent to said top end cap; said second servo-accelerometer is secured inside said hollow body beneath said first servo-accelerometer, said first amplifier is secured inside said hollow body beneath said second servo-accelerometer; said second amplifier is secured inside said hollow body beneath said first amplifier, said third amplifier is secured inside said hollow body beneath said second amplifier and said rotational variable differential transformer is secured inside said hollow body adjacent said bottom end cap.

4. A deflection meter as defined in claim 3 wherein said first servo-accelerometer and said second servo-accelerometer are secured inside said hollow body such that said first and second servo-accelerometers are oriented perpendicular to each other.

5. A deflection meter as defined in claim 4 wherein said first servo-accelerometer, said second servo-accelerometer, said first amplifier, said second amplifier, and said third amplifier are secured inside said hollow body such that said first servo-accelerometer, said second servo-accelerometer, said first amplifier, said second amplifier and said third amplifier can be removed from said hollow body as a single unit by removing said top end cap from said hollow body and then withdrawing said single unit by means of said top end cap.

6. A deflection meter as defined in claim 5 wherein said rotational variable differential transformer is secured inside said hollow body such that said rotational variable differential transformer can be removed from said hollow body by removing said bottom end cap from said hollow body and then withdrawing said variable differential transformer by means of said bottom end cap.

7. A deflection meter as defined in claim 6 wherein said meter is a digital meter and wherein said digital meter is coupled to said source of electrical power through an inverter, a second "ON-OFF" switch and said "ON-OFF" switch, said inverter, said second "ON-OFF" and said "ON-OFF" switch being connected in series between said digital meter and said source of electrical power.

8. A deflection meter as defined in claim 7 further including a base plate detachably secured to said bottom end cap.

9. A deflection meter as defined in claim 7, wherein said first guide means includes a first wheel assembly having four wheels positioned ninety degrees from one another around an axis, separate tension spring means associated with each one of said four wheels for biasing each wheel in a direction away from said control axis and separate means for individually adjusting the tension of each one of said separate tension spring means.

10. A deflection meter as defined in claim 9, wherein said second guide means includes a second wheel assembly detachably secured to said bottom end cap, said second wheel assembly having four wheels positioned ninety degrees from one another around an axis, separate tension spring means associated with each one of said four wheels for biasing each wheel in a direction away from said control axis and separate tension adjusting means for individually adjusting the tension of each one of said separate tension spring means.

* * * * *